(12) United States Patent
Bhattad et al.

(10) Patent No.: US 9,609,559 B2
(45) Date of Patent: Mar. 28, 2017

(54) IDLE MODE OPERATION IN HETEROGENEOUS NETWORKS

(71) Applicant: QUALCOMM INCORPORATED, San Diego, CA (US)

(72) Inventors: Kapil Bhattad, San Diego, CA (US); Alexei Yurievitch Gorokhov, San Diego, CA (US); Tingfang Ji, San Diego, CA (US); Ke Liu, San Diego, CA (US); Tao Luo, San Diego, CA (US); Xiliang Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/726,398

(22) Filed: May 29, 2015

(65) Prior Publication Data

US 2015/0264610 A1 Sep. 17, 2015

Related U.S. Application Data

(63) Continuation of application No. 13/650,082, filed on Oct. 11, 2012, now Pat. No. 9,078,201.

(Continued)

(51) Int. Cl.
*H04W 36/04* (2009.01)
*H04B 1/7107* (2011.01)
(Continued)

(52) U.S. Cl.
CPC .......... *H04W 36/04* (2013.01); *H04B 1/7107* (2013.01); *H04J 11/0056* (2013.01);
(Continued)

(58) Field of Classification Search
CPC .... H04B 1/7107; H04W 28/04; H04W 48/20; H04W 84/045; H04W 36/04;
(Continued)

(56) References Cited

U.S. PATENT DOCUMENTS 7,254,197 B2 8/2007 Heo et al.
7,747,275 B2 6/2010 Funnell et al.
(Continued)

FOREIGN PATENT DOCUMENTS

EP 1406395 A2 4/2004
EP 1594327 A1 11/2005
(Continued)

OTHER PUBLICATIONS

Alcatel-Lucent: "Idle mode Requirements in HetNet", 3GPP TSG-RAN WG4 Meeting #AH57 R4-110352, Austin, TX, Jan. 11, 2011.
(Continued)

*Primary Examiner* — Meless Zewdu
(74) *Attorney, Agent, or Firm* — Seyfarth Shaw LLP

(57) ABSTRACT

An idle mode UE can RACH to a cell different from the cell paging the UE. The UE can be allocated additional time to respond to all cells in the neighborhood to identify the cell in which to RACH. Interference cancellation can occur at different rates based on whether the UE is in connected mode or idle mode. The time to respond to the page can be a function of a paging cycle. Additionally, a variable bias may promote early handoff to lower power cells and late handoff to high power cells.

24 Claims, 16 Drawing Sheets

Related U.S. Application Data

(60) Provisional application No. 61/547,636, filed on Oct. 14, 2011, provisional application No. 61/558,342, filed on Nov. 10, 2011.

(51) Int. Cl.
*H04W 48/20* (2009.01)
*H04J 11/00* (2006.01)
*H04W 36/00* (2009.01)
*H04W 36/08* (2009.01)
*H04W 68/02* (2009.01)
*H04W 28/04* (2009.01)
*H04W 84/04* (2009.01)
*H04W 16/14* (2009.01)

(52) U.S. Cl.
CPC ....... *H04W 36/0083* (2013.01); *H04W 36/08* (2013.01); *H04W 48/20* (2013.01); *H04W 68/02* (2013.01); *H04W 16/14* (2013.01); *H04W 28/04* (2013.01); *H04W 84/045* (2013.01); *Y02B 60/50* (2013.01)

(58) Field of Classification Search
CPC . H04W 36/0083; H04W 36/08; H04W 68/02; H04W 16/14; H04W 36/00; H04W 52/0238; H04W 52/244; H04W 68/025; H04W 28/048; H04W 48/00; H04W 76/06; Y02B 60/50; H04J 11/0056; H04J 11/00; H04J 11/005; H04L 25/03821
See application file for complete search history.

(56) References Cited

U.S. PATENT DOCUMENTS

| | | | |
|---|---|---|---|
| 2003/0157937 A1 | 8/2003 | Oikarinen et al. | |
| 2006/0239231 A1 | 10/2006 | Hong | |
| 2009/0252139 A1* | 10/2009 | Ludovico | H04W 16/32 370/342 |
| 2010/0027510 A1 | 2/2010 | Balasubramanian et al. | |
| 2010/0054237 A1* | 3/2010 | Han | H04J 3/0638 370/350 |
| 2010/0085913 A1 | 4/2010 | Subrahmanya | |
| 2010/0113070 A1 | 5/2010 | Nigam et al. | |
| 2010/0135251 A1* | 6/2010 | Sambhwani | H04W 8/26 370/331 |
| 2010/0167756 A1* | 7/2010 | Park | H04W 64/00 455/456.1 |
| 2010/0317347 A1* | 12/2010 | Burbidge | H04W 36/0094 455/436 |
| 2010/0323610 A1* | 12/2010 | Li | H04W 68/02 455/3.01 |
| 2011/0076960 A1* | 3/2011 | Yun | H04W 24/10 455/67.14 |
| 2011/0080896 A1* | 4/2011 | Krishnamurthy | H04W 56/0045 370/336 |
| 2011/0194527 A1 | 8/2011 | Lin et al. | |
| 2011/0207459 A1 | 8/2011 | Ramasamy et al. | |
| 2011/0238834 A1 | 9/2011 | Nair et al. | |
| 2011/0255486 A1 | 10/2011 | Luo et al. | |
| 2011/0312338 A1* | 12/2011 | Park | H04W 60/02 455/456.1 |
| 2012/0008511 A1 | 1/2012 | Fan et al. | |
| 2012/0046063 A1 | 2/2012 | Chande et al. | |
| 2012/0113844 A1 | 5/2012 | Krishnamurthy | |
| 2012/0115485 A1 | 5/2012 | Narasimha et al. | |
| 2012/0231790 A1 | 9/2012 | Lindoff et al. | |
| 2013/0034051 A1 | 2/2013 | Vartiainen et al. | |
| 2013/0095829 A1 | 4/2013 | Bhattad et al. | |
| 2013/0128765 A1* | 5/2013 | Yang | H04W 24/00 370/252 |

FOREIGN PATENT DOCUMENTS

| | | |
|---|---|---|
| JP | 2012235318 A | 11/2012 |
| JP | 2013544054 A | 12/2013 |
| KR | 20040031596 A | 4/2004 |
| WO | 2010049243 A1 | 5/2010 |
| WO | 2011085399 A1 | 7/2011 |
| WO | 2012062196 A1 | 5/2012 |

OTHER PUBLICATIONS

Motorola: "Paging Channel Reliability Issue in Idle Mode and ABSF Patterns", 3GPP TSG-RAN WG4 Meeting #57 R4-104648, Jacksonville, USA, Nov. 12, 2010, 5 Pages.

Qualcomm Incorporated: "eICIC: Idle Mode discussion", 3GPP TSG-RAN WG2 Meeting #72 R2-106344, Jacksonville, USA, Nov. 9, 2010, pp. 1-3.

Renesas Mobile Europe Ltd: "eICIC on Idle Mode considerations", 3GPP TSG-RAN WG2 Meeting #75 R2-114050, Athens, Greece, Aug. 16, 2011, 4 Pages.

International Search Report and Written Opinion—PCT/US2012/060096—ISA/EPO—Mar. 8, 2013.

Partial International Search Report—PCT/US2012/060096—ISA/EPO—Jan. 22, 2013.

Alcatel-Lucent: "Idle Mode Requirements in HetNet," 3GPP Draft; R4-110352, 3rd Generation Partnership Project (3GPP), Mobile Competence Centre ; 650, Route Des Lucioles ; F-06921 Sophia-Antipolis Cedex ; France, vol. RAN WG4, No. Austin; Jan. 17, 2011, Jan. 11, 2011 (Jan. 11, 2011), XP050500306, [retrieved on Jan. 11, 2011].

China Telecom et al., "Use Cases and Main Issues for Idle Mode eICIC," 3GPP Draft; R2-114436 Idle Mode EICIC, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Aug. 22, 2011, Aug. 16, 2011 (Aug. 16, 2011), KP050540109, [retrieved on Aug. 16, 2011].

European Search Report—EP16162032—Search Authority—The Hague—Jul. 1, 2016.

Nokia Siemens Networks: et al., "Discussion of HetNet Mobility Topics for Rel-11", 3GPP TSG-RAN WG2#74, R2-113126, May 3, 2011, pp. 1-4, URL:http://www.3gpp.org/ftp/tsg_ran/WG2_RL2/TSGR2_74/Docs/R2-113126.zip.

Renesas Mobile Europe Ltd: "Improvement of Higher Priority Reselection", 3GPP TSG-RAN WG4#60bis, R4-115219, Oct. 3, 2011, pp. 1-8, URL:http://www.3gpp.org/ftp/tsg_ran/WG4_Radio/TSGR4_60bis/Docs/R4-115219.zip.

Samsung: "CRS Interference Cancellation in HetNet Scenarios for UE Performance Requirements", 3GPP TSG-RAN WG1#66, R1-112507, Aug. 16, 2011, pp. 1-3, URL:http://www.3gpp.org/ftp/tsg_ran/WG1_RL1/TSGR1_66/Docs/R1-112507.zip.

* cited by examiner

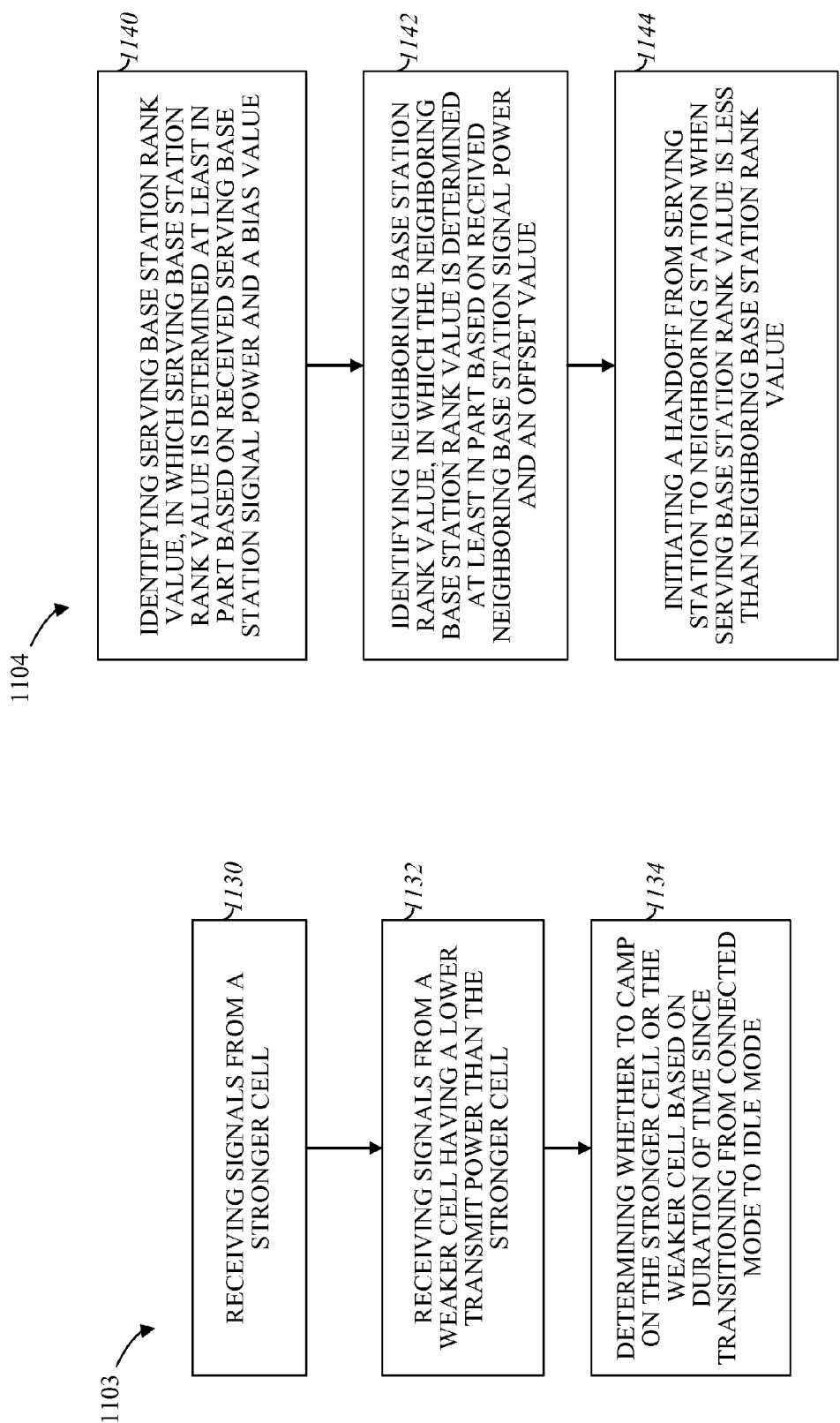

IDLE MODE OPERATION IN HETEROGENEOUS NETWORKS

CROSS-REFERENCE TO RELATED APPLICATIONS

This application is a continuation of U.S. patent application Ser. No. 13/650,082, entitled "IDLE MODE OPERATION IN HETEROGENEOUS NETWORKS," filed on Oct. 11, 2012, which claims the benefit under 35 U.S.C. §119(e) to U.S. Provisional Patent Application No. 61/547,636, entitled "IDLE MODE OPERATION IN HETEROGENEOUS NETWORKS," filed on Oct. 14, 2011, and to U.S. Provisional Patent Application No. 61/558,342, entitled "IDLE MODE OPERATION IN HETEROGENEOUS NETWORKS," filed on Nov. 10, 2011, the disclosures of which are expressly incorporated by reference herein in entirety.

BACKGROUND

Field

Aspects of the present disclosure relate generally to wireless communication systems, and more particularly to user equipment (UE) idle mode behavior when a UE is camped on a macro cell or pico cell.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

Aspects of the present disclosure are directed to idle mode behavior and in particular to balancing between a faster response time and idle mode power consumption.

According to one aspect of the present disclosure, a method for wireless communication is disclosed. The method includes camping on a weaker cell in a cell range expansion (CRE) region in presence of a stronger signal from at least one stronger cell. The method also includes performing interference cancellation (IC) on at least one signal from the stronger cell at a first rate when in idle mode, and at a second faster rate when in connected mode.

According to another aspect of the present disclosure, a method for wireless communication is disclosed and includes decoding a page from a first cell. The method also includes determining whether to connect to a different second cell in response to decoding the page. The method further includes responding to the page by connecting to the first cell or the second cell based at least in part on the determination.

In another aspect of the present disclosure, a method for wireless communication is disclosed and includes receiving signals from a stronger cell. The method also includes receiving signals from a weaker cell. The weaker cell has a lower transmit power than the stronger cell. The method further includes determining whether to camp on the stronger cell or the weaker cell based at least in part on a duration of time since transitioning from connected mode to idle mode.

According to one aspect of the present disclosure, a method for wireless communication is disclosed that includes identifying a serving base station rank value. The serving base station rank value is determined, at least in part, based on a received serving base station signal power and a bias value. The method also includes identifying a neighboring base station rank value, in which the neighboring base station rank value is determined, at least in part, based on a received neighboring base station signal power and an offset value. The method further includes initiating a handoff from the serving station to the neighboring station when the serving base station rank value is less than the neighboring base station rank value.

According to another aspect of the present disclosure, an apparatus for wireless communication includes means for camping on a weaker cell in a CRE region in presence of a stronger signal from at least one stronger cell. The apparatus also includes means for performing IC on at least one signal from the stronger cell at a first rate when in idle mode, and at a second faster rate when in connected mode.

According to another aspect of the present disclosure, an apparatus for wireless communication includes means for decoding a page from a first cell. The apparatus also includes means for determining whether to connect to a different second cell in response to decoding the page. The apparatus further includes means for responding to the page by connecting to the first cell or the second cell based at least in part on the determination.

According to another aspect of the present disclosure, an apparatus for wireless communication includes means for receiving signals from a stronger cell. The apparatus also includes means for receiving signals from a weaker cell having a lower transmit power than the stronger cell. The apparatus further includes means for determining whether to camp on the stronger cell or the weaker cell based at least in part on a duration of time since transitioning from connected mode to idle mode.

According to another aspect of the present disclosure, an apparatus for wireless communication includes means for identifying a serving base station rank value. The serving base station rank value is determined at least in part based on a received serving base station signal power and a bias value. The apparatus also includes means for identifying a neighboring base station rank value, in which the neighboring base station rank value is determined at least in part based on a received neighboring base station signal power and an offset value. The apparatus further includes means for initiating a handoff from the serving station to the neighboring station when the serving base station rank value is less than the neighboring base station rank value.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of camping on a weaker cell in a CRE region in presence of a stronger signal from at least one stronger cell. The program code also causes the processor(s) to perform interference cancellation on at least one signal from the stronger cell at a first rate when in idle mode, and at a second faster rate when in connected mode.

According to another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of decoding a page from a first cell. The program code also causes the processor(s) to determine whether to connect to a different second cell in response to decoding the page. The program code also causes the processor(s) to respond to the page by connecting to the first cell or the second cell based at least in part on the determination.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of receiving signals from a stronger cell. The program code also causes the processor(s) to receive signals from a weaker cell having a lower transmit power than the stronger cell. The program code also causes the processor(s) to determine whether to camp on the stronger cell or the weaker cell based at least in part on a duration of time since transitioning from connected mode to idle mode.

According to another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of identifying a serving base station rank value, in which the serving base station rank value is determined at least in part based on a received serving base station signal power and a bias value. The program code also causes the processor(s) to identify a neighboring base station rank value, in which the neighboring base station rank value is determined at least in part based on a received neighboring base station signal power and an offset value. The program code also causes the processor(s) to initiate a handoff from the serving station to the neighboring station when the serving base station rank value is less than the neighboring base station rank value.

In another aspect of the present disclosure, an apparatus for wireless communication includes a memory and a processor(s) coupled to the memory. The processor(s) is configured to have a UE camp on a weaker cell in a CRE region in presence of a stronger signal from at least one stronger cell. The processor(s) is also configured to perform interference cancellation on at least one signal from the stronger cell at a first rate when in idle mode, and at a second faster rate when in connected mode.

According to another aspect of the present disclosure, an apparatus for wireless communication includes a memory and a processor(s) coupled to the memory. The processor(s) is configured to decode a page from a first cell. The processor(s) is further configured to determine whether to connect to a different second cell in response to decoding the page. The processor(s) is further configured to respond to the page by connecting to the first cell or the second cell based at least in part on the determination.

According to another aspect of the present disclosure, an apparatus for wireless communication includes a memory and a processor(s) coupled to the memory. The processor(s) is configured to receive signals from a stronger cell. The processor(s) is further configured to receive signals from a weaker cell having a lower transmit power than the stronger cell. The processor(s) is further configured to determine whether to camp on the stronger cell or the weaker cell based at least in part on a duration of time since transitioning from connected mode to idle mode.

According to another aspect of the present disclosure, an apparatus for wireless communication includes a memory and a processor(s) coupled to the memory. The processor(s) is configured to identify a serving base station rank value, in which the serving base station rank value is determined at least in part based on a received serving base station signal power and a bias value. The processor(s) is further configured to identify a neighboring base station rank value, in which the neighboring base station rank value is determined at least in part based on a received neighboring base station signal power and an offset value. The processor(s) is further configured to initiate a handoff from the serving station to the neighboring station when the serving base station rank value is less than the neighboring base station rank value.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 11A-11D are block diagrams illustrating methods for idle mode operation in heterogeneous networks.

DETAILED DESCRIPTION

Figure 1:
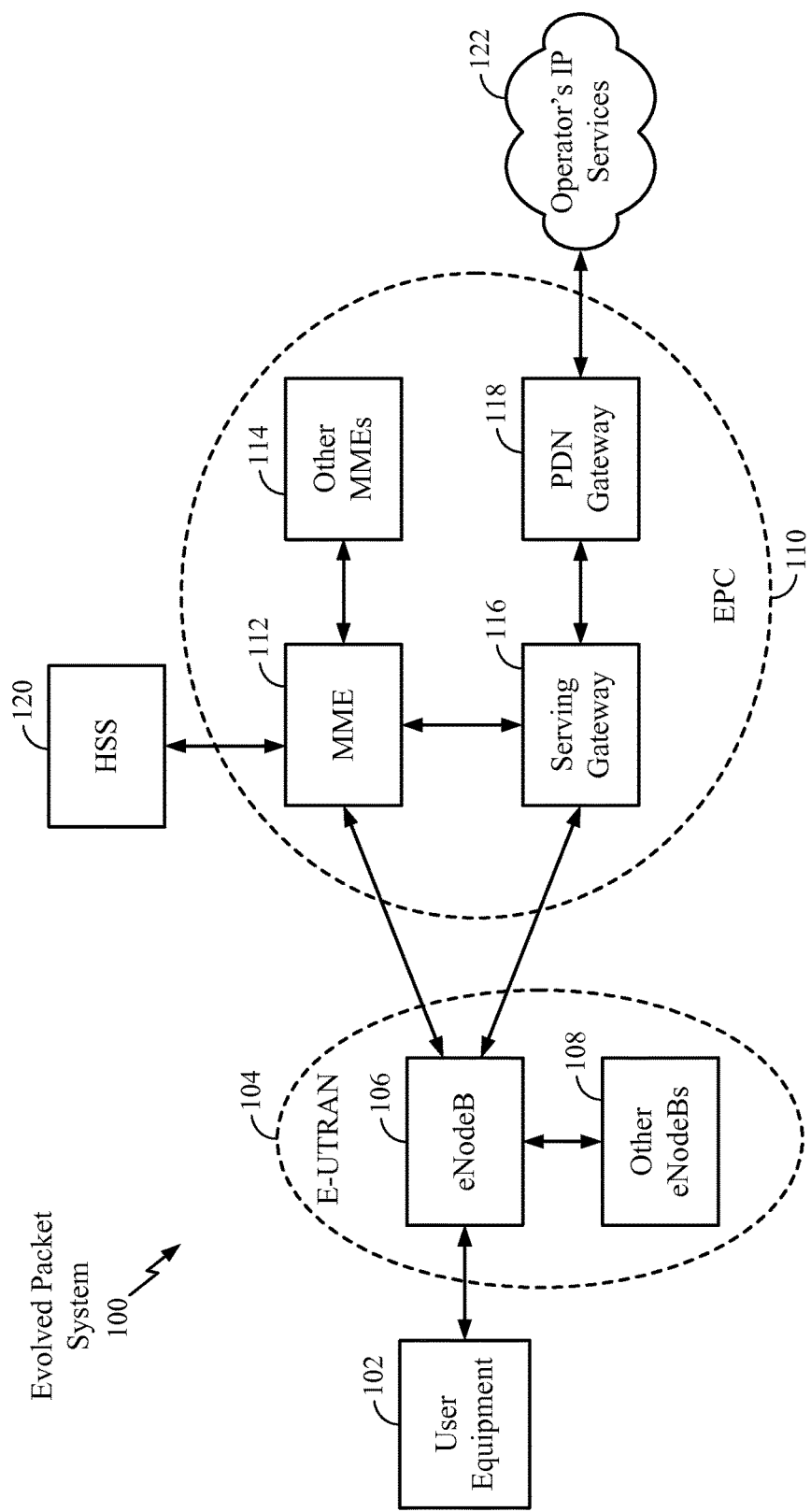
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
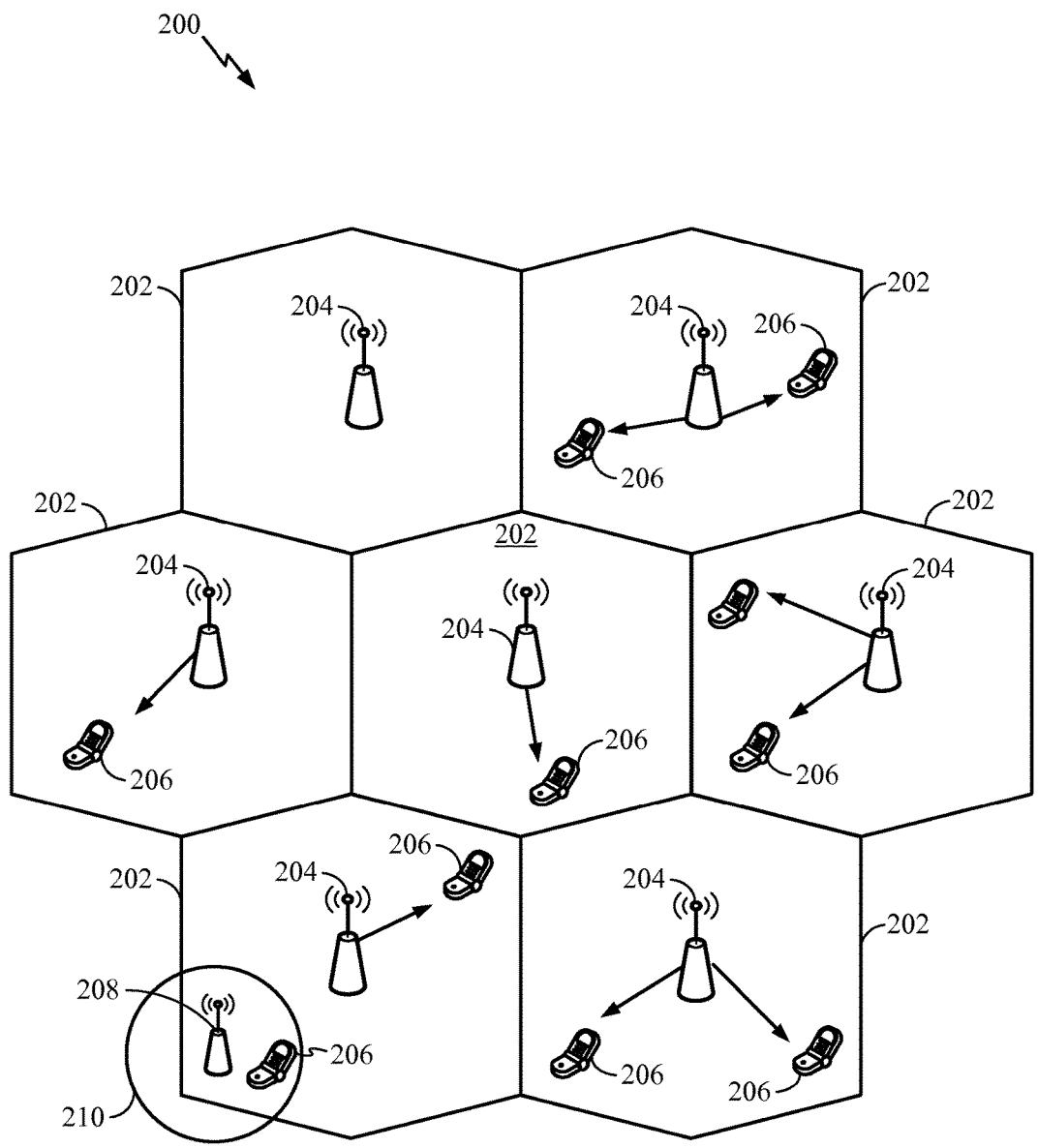
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
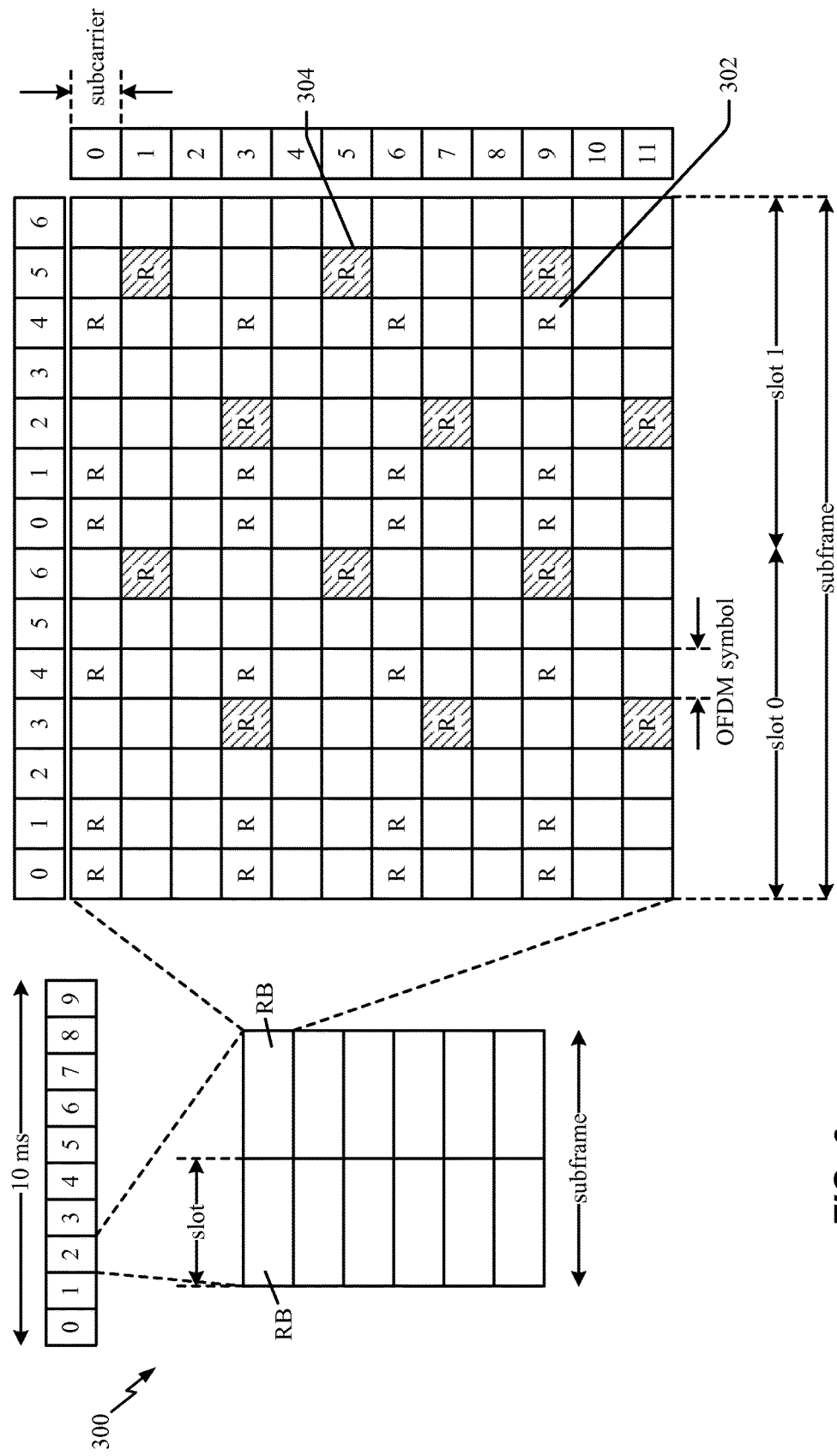
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
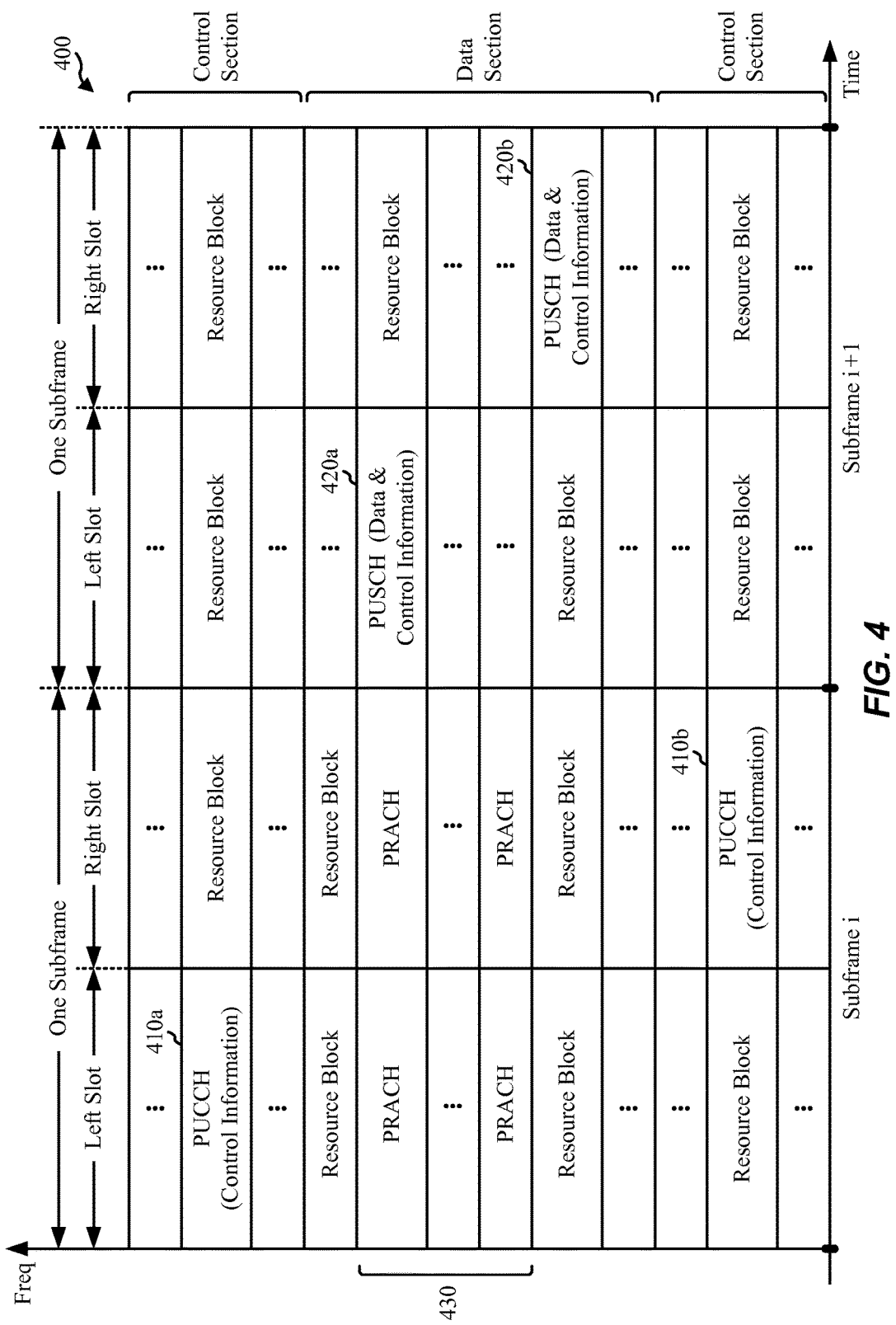
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
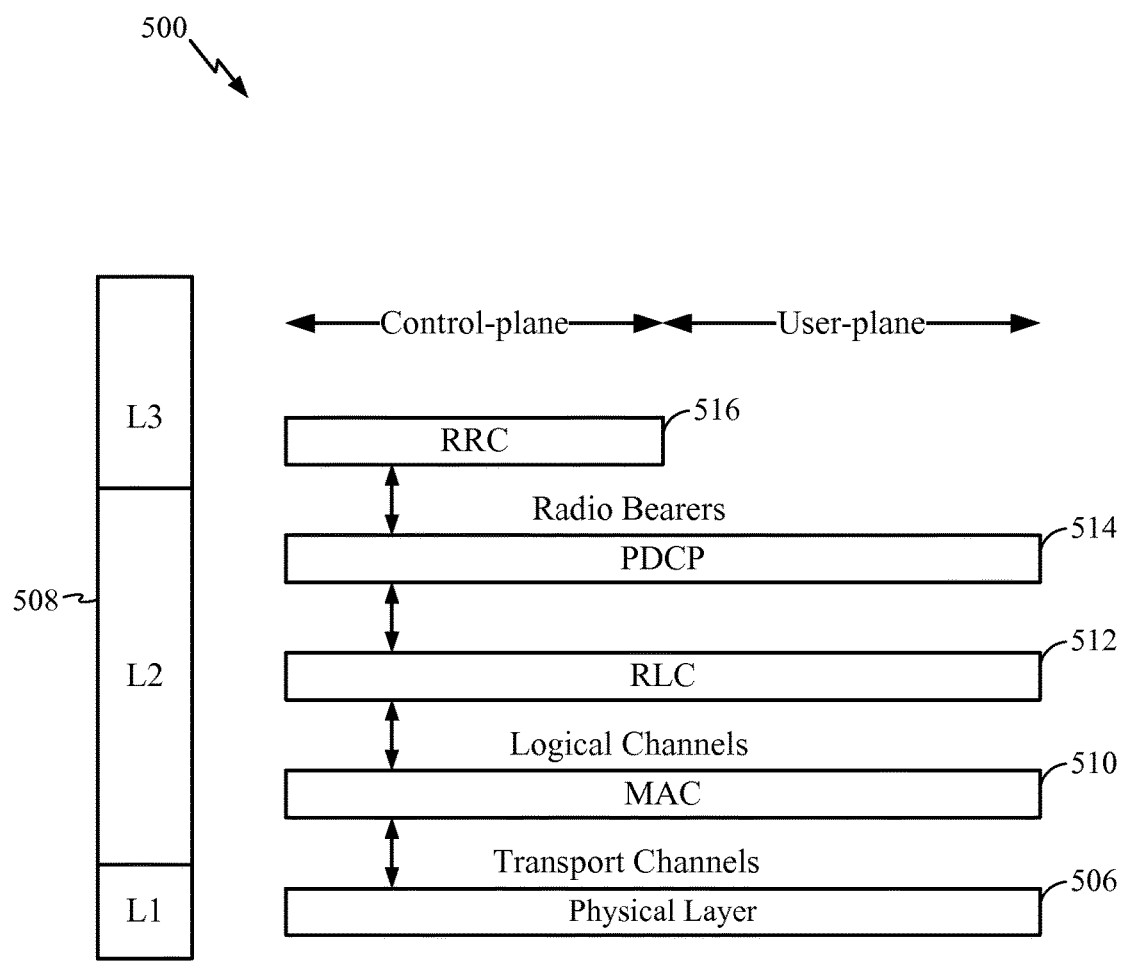
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
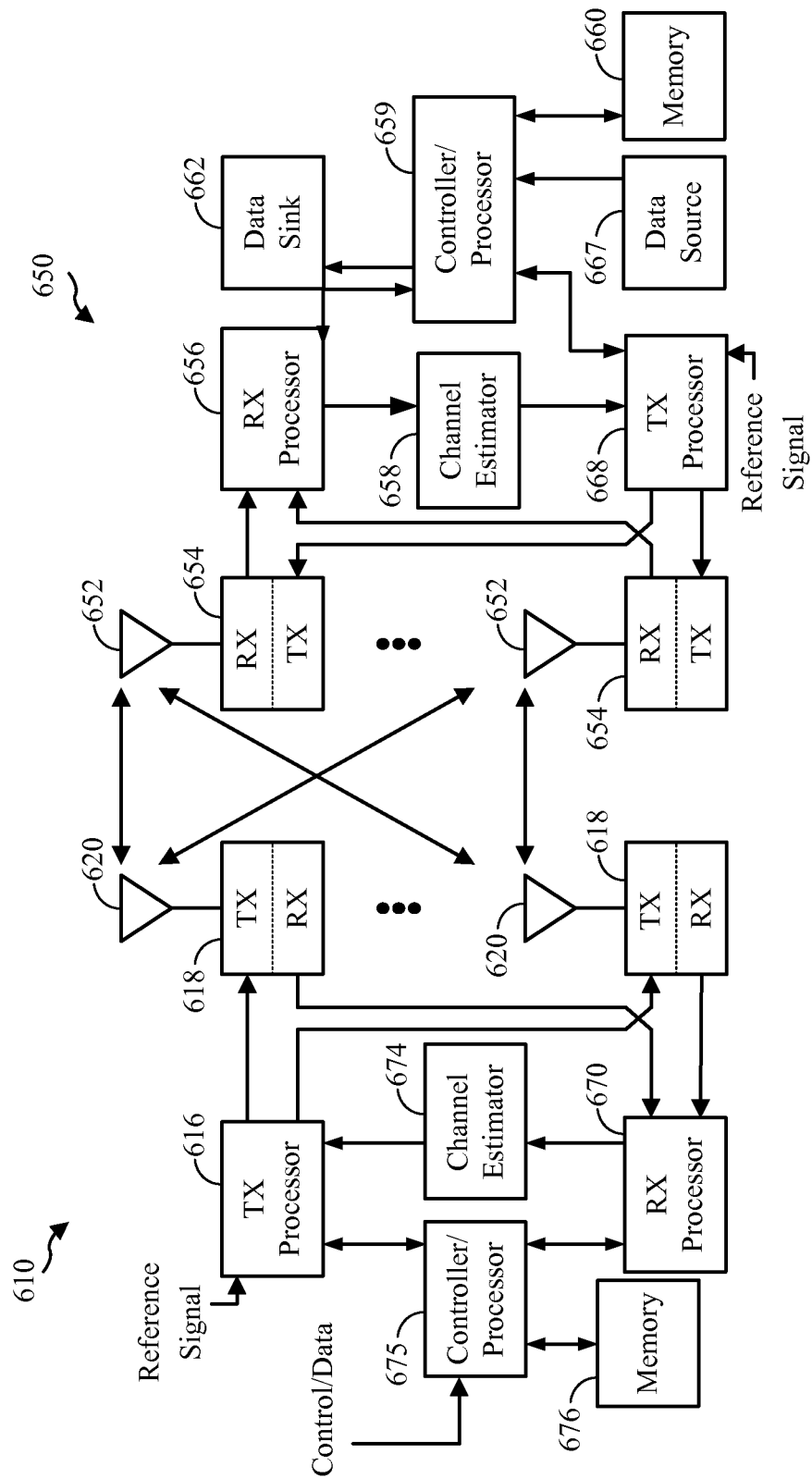
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Heterogeneous Network

A homogeneous network is a network of base station in a planned layout and a collection of user terminals, in which all of the base stations have similar transmit power levels, antenna patterns, receiver noise floors and similar backhaul connectivity to the data network. Heterogeneous networks include base stations with different power levels. For example, three power classes may be defined, in decreasing power class, as macro eNodeBs, pico eNodeBs, and femto eNodeBs. When macro eNodeBs, pico eNodeBs, and femto eNodeBs are in a co-channel deployment, the power spectral density (PSD) of the macro eNodeB (aggressor eNodeB) may be larger than the PSD of the pico eNodeB and the femto eNodeB (victim eNodeBs) creating large amounts of interference with the pico eNodeB and the femto eNodeB. Protected subframes may be used to reduce or minimize interference with the pico eNodeBs and femto eNodeBs. That is, a protected subframe may be scheduled for the victim eNodeB to correspond with a prohibited subframe on the aggressor eNodeB.

In the operation of a heterogeneous network, each UE typically associates with the cell with the strongest received downlink power. In particular, each UE is usually served by the eNodeB with the better signal quality, while the unwanted signals received from the other eNodeBs are treated as interference. While such operational principals can lead to significantly sub-optimal performance, gains in network performance are realized in the wireless network by using intelligent resource coordination among the eNodeBs, better server selection strategies, and more advanced techniques for efficient interference management.

A pico eNodeB is characterized by a substantially lower transmit power when compared with a macro eNodeB. A pico eNodeB will also usually be placed around a network in an ad hoc manner. Because of this unplanned deployment, wireless networks with pico eNodeB placements can be expected to have large areas with low signal to interference conditions, which can make for a more challenging radio frequency (RF) environment for control channel transmissions to UEs on the edge of a coverage area or cell (a "cell-edge" UE). Moreover, the potentially large disparity (e.g., approximately 20 dB) between the transmit power levels of the macro eNodeBs and the pico eNodeB implies that, in a mixed deployment, the downlink coverage area of the pico eNodeB will be much smaller than that of the macro eNodeBs.

In the uplink case, however, the signal strength of the uplink signal is governed by the UE, and, thus, will be similar when received by any type of eNodeBs (e.g., macro eNodeB, pico eNodeB, etc.). With the uplink coverage areas for the different eNodeBs being roughly the same or similar, the uplink handoff boundaries will be determined based on channel gains. This can lead to a mismatch between downlink handover boundaries and uplink handover boundaries. Without additional network accommodations, the mismatch would make the server selection or the association of UE to eNodeB more difficult in the wireless network than in a macro eNodeB-only homogeneous network, where the downlink and uplink handover boundaries are more closely matched.

If server selection is based predominantly on downlink received signal strength, as provided in the LTE Release 8 standard, the usefulness of mixed eNodeB deployment of heterogeneous networks may be greatly diminished. This is because the larger coverage area of the higher powered macro eNodeBs limits the benefits of splitting the cell coverage with the pico eNodeBs because, the higher downlink received signal strength of the macro eNodeBs will attract all of the available UEs, while the pico eNodeB may not be serving any UE because of its much weaker downlink transmission power. Moreover, the macro eNodeBs will likely not have sufficient resources to efficiently serve those UEs. Therefore, wireless networks attempt to actively balance the load between the macro eNodeBs and the pico eNodeB(s) by expanding the coverage area of the pico eNodeB. This concept is referred to as range extension.

The wireless network can achieve range extension by changing the manner in which server selection is determined Instead of basing server selection on downlink received signal strength, selection is based more on the quality of the downlink signal. In one such quality-based determination, server selection may be based on determining the eNodeB that offers the minimum path loss to the UE. Additionally, the wireless network may provide a fixed partitioning of resources equally between the macro eNodeBs and the pico eNodeB. However, even with this active balancing of load, downlink interference from the macro eNodeBs should be mitigated for the UEs served by the pico eNodeBs. This can be accomplished by various methods, including interference cancellation at the UE, resource coordination among the eNodeBs, or the like.

In a heterogeneous network with range extension, different techniques for interference coordination may be employed to manage interference and allow UEs to obtain service from the lower-powered eNodeBs (e.g., pico eNodeBs) in the presence of the stronger downlink signals transmitted from the higher-powered eNodeBs, (e.g., macro eNodeBs). For example, inter-cell interference coordination (ICIC) may be used to reduce interference from cells in co-channel deployment. One ICIC mechanism is adaptive resource partitioning. Adaptive resource partitioning assigns subframes to certain eNodeBs. In subframes assigned to a first eNodeB, neighbor eNodeBs do not transmit. Thus, interference experienced by a UE served by the first eNodeB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNodeB for use exclusively by the first eNodeB. Protected subframes may also be referred to as "clean" subframes based on the lack of interference from neighboring eNodeBs. Prohibited subframes are subframes assigned to a neighbor eNodeB, and the first eNodeB is prohibited from transmitting data during the prohibited subframes. For example, a prohibited subframe of the first eNodeB may correspond to a protected subframe of a second interfering eNodeB. Thus, the first eNodeB is the only eNodeB transmitting data during the first eNodeB's protected subframe. Common subframes may be used for data transmission by multiple eNodeBs. Common subframes may also be referred to as "unclean" subframes because of the possibility of interference from other eNodeBs.

At least one protected subframe is statically assigned per period. In some cases only one protected subframe is statically assigned. For example, if a period is 8 milliseconds, one protected subframe may be statically assigned to an eNodeB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Figure 7:
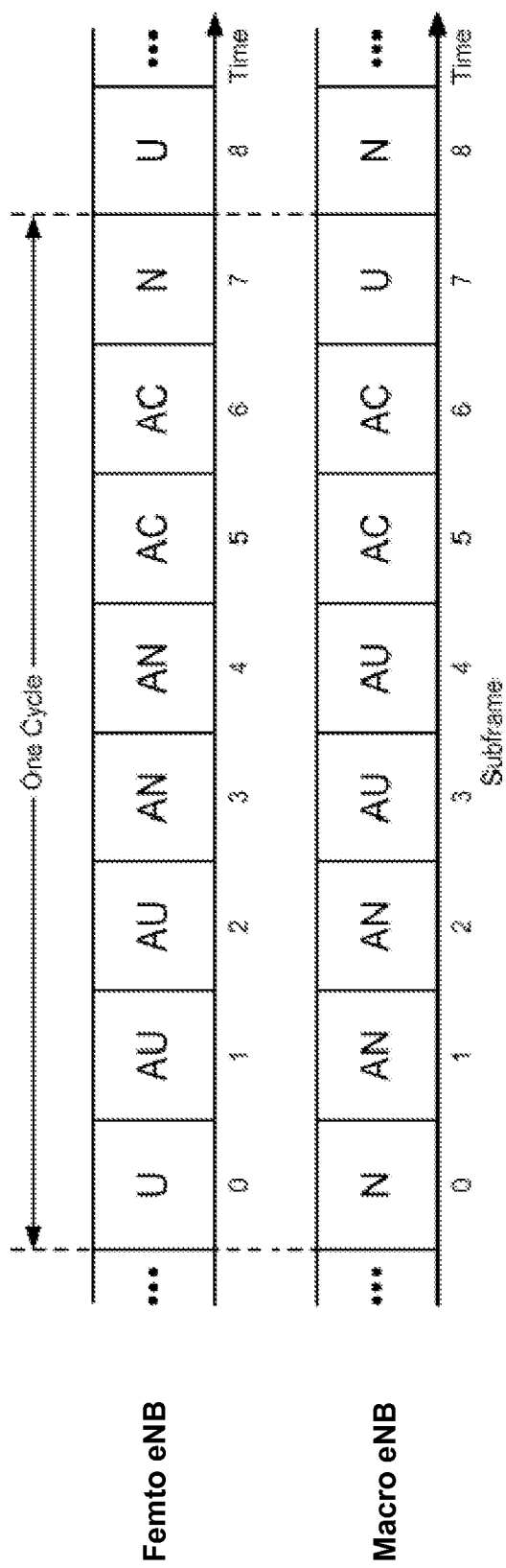
FIG. 7 is a block diagram conceptually illustrating adaptive resource partitioning in a heterogeneous network according to one aspect of the disclosure.

FIG. 7 is a block diagram illustrating subframe partitioning in a heterogeneous network according to one aspect of the disclosure. A first row of blocks illustrate subframe assignments for a femto eNodeB, and a second row of blocks illustrate subframe assignments for a macro eNodeB. Each of the eNodeBs has a static protected subframe during which the other eNodeB has a static prohibited subframe. For example, the femto eNodeB has a protected subframe (U subframe) in subframe 0 corresponding to a prohibited subframe (N subframe) in subframe 0. Likewise, the macro eNodeB has a protected subframe (U subframe) in subframe 7 corresponding to a prohibited subframe (N subframe) in subframe 7. Subframes 1-6 are dynamically assigned as either protected subframes (AU), prohibited subframes (AN), or common subframes (AC). The dynamically assigned subframes (AU/AN/AC) are referred to herein collectively as "X" subframes. During the dynamically assigned common subframes (AC) in subframes 5 and 6, both the femto eNodeB and the macro eNodeB may transmit data.

Protected subframes (such as U/AU subframes) have reduced interference and a high channel quality because aggressor eNodeBs are prohibited from transmitting. Prohibited subframes (such as N/AN subframes) have no data transmission to allow victim eNodeBs to transmit data with low interference levels. Common subframes (such as C/AC subframes) have a channel quality dependent on the number of neighbor eNodeBs transmitting data. For example, if neighbor eNodeBs are transmitting data on the common subframes, the channel quality of the common subframes may be lower than the protected subframes. Channel quality on common subframes may also be lower for cell range expansion area (CRE) UEs strongly affected by aggressor eNodeBs. An CRE UE may belong to a first eNodeB but also be located in the coverage area of a second eNodeB. For example, a UE communicating with a macro eNodeB that is near the range limit of a femto eNodeB coverage is an CRE UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. I In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 µs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between combinations of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Bias and Cell Range Expansion Areas

When a UE is in a cell range expansion (CRE) region, the UE is assigned to a pico cell even though the signal received from the macro cell is much stronger. The difference between the received power of the macro cell and the received power of the pico cell in dBs, when the UE is asked to connect to the pico cell under these conditions, is referred to as "bias." The UE and/or eNodeBs may consider bias, as well as other aspects, such as loading on different cells and resource partitioning between them, before establishing connection. Using this definition of bias, the range expansion region can be described as the region where the received power of the pico cell is less than the received power of the macro but the difference (macro power in db–pico power in db) is less than the bias. Accordingly, the size of the bias may define the CRE region, i.e., a larger bias will tend towards a large CRE region and smaller bias will tend towards a smaller CRE region.

Figure 8B:
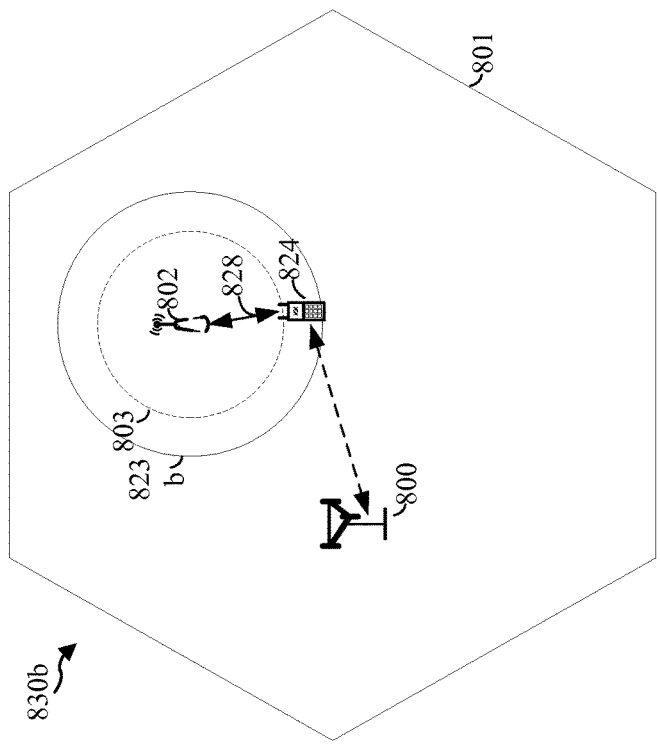
FIGS. 8A-8B are diagrams conceptually illustrating cell range expansion regions of different sizes within a macro cell area of an LTE wireless network.
Figure 8A:
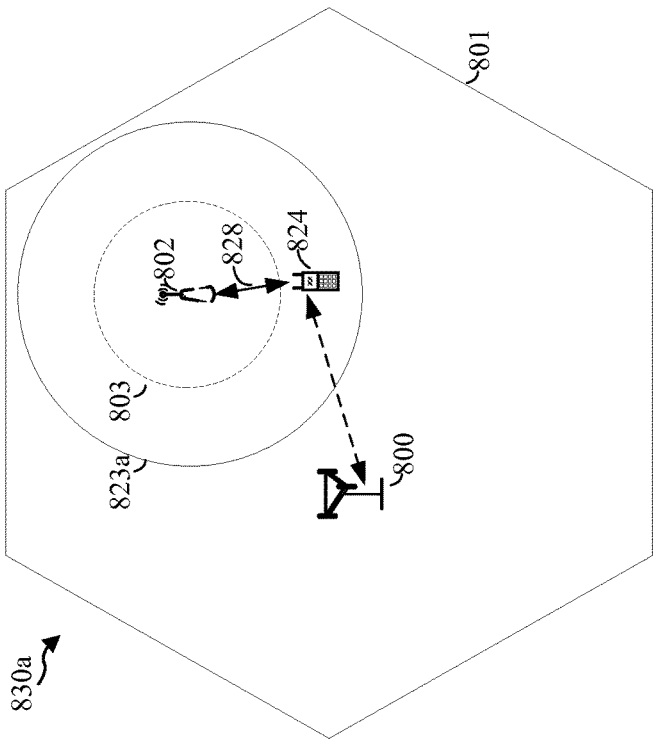

For example, FIG. 8A illustrates a wireless network 830a having a macro cell 801 served by a macro cell base station 800. A pico cell 803 is overlaid within the coverage area of the macro cell 801. The wireless network 830a supports cell range expansion and the coverage of the pico base station 802 is expanded to a greater coverage area of the pico cell 823a (i.e., cell range expansion region 823a). A UE 824 is located within the macro cell 801 and also within the expanded pico cell 823a and maintains communications with the pico base station 802.

FIG. 8B illustrates a wireless network 830b having a macro cell 801 served by a macro cell base station 800. A pico cell 803 is overlaid within the coverage area of the macro cell 801. The wireless network 830b supports cell range expansion and the coverage of the pico base station 802 is expanded to a greater coverage area of the pico cell 823b. A UE 824 is located within the macro cell 801 and also within the expanded pico cell 823b (cell range expansion region 823b). However, the cell range expansion region 823b (of FIG. 8B) is smaller than the cell range expansion region 823a (of FIG. 8A).

One design to enable communications in such a scenario is to use synchronous networks such that synchronization signals and the physical broadcast channel (PBCH) collide. Interference cancellation (IC), such as PSS/SSS IC and PBCH IC, may be used to cancel the stronger signal from the macro cell to enable detecting of the weaker pico cell.

As noted above, communicating in the CRE region can be further enabled via resource partitioning between the macro and pico cells. With resource partitioning, the macro cell clears certain subframes, creating protected subframes (e.g., the macro cell does not transmit any signal that is not mandatory for that subframe). The pico cell may transmit data on the cleared subframes to its CRE UEs, with minimal or no interference from the stronger base station on those subframes. Interference cancellation may be used to remove residual interference from the common reference signal (CRS), etc.

Figure 9:
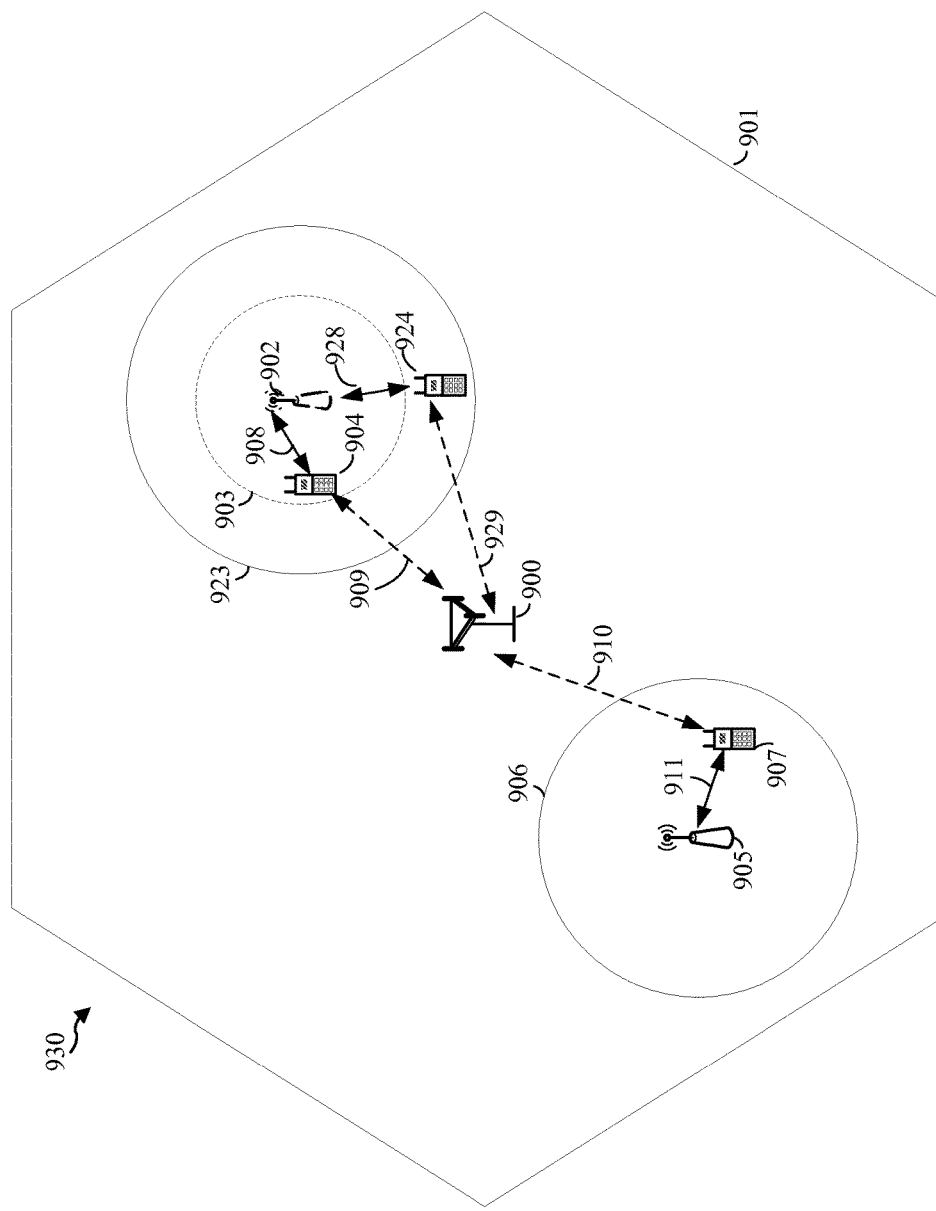
FIG. 9 is a diagram conceptually illustrating pico cells within a macro cell area of an LTE wireless network.

Referring to FIG. 9, a block diagram conceptually illustrates a macro cell 901 within a wireless network 930. The macro base station 900 serves macro cell 901. Pico base station 902 serves pico cell 903, and pico base station 905 serves pico cell 906. Pico cells 903 and 906 are overlaid within the coverage area of the macro cell 901. While only the macro cell 901 is illustrated in FIG. 9, the wireless network 930 may include multiple macro cells, similar to the macro cell 90.

The pico base station 905 has a zero BIAS, while the base station 902 has a BIAS substantially greater than 0. A UE 907 is located within the macro cell 901 and also within the pico cell 906. The UE 907 communicates with the pico base station 905, while receiving interference 910 from the macro base station 900. The UE 904 is located within the macro cell 901 and also within the pico cell 903. The UE 904 maintains communications with the pico base station 902, while receiving interference 909 from the macro base station 900. The wireless network 930 supports cell range expansion, and the coverage of the pico base station 902 is expanded to a greater coverage area of pico cell 923. A UE 924 is located within the macro cell 901 and also within the expanded pico cell 923. The UE 904 maintains communications 928 with the pico base station 902, while receiving interference 929 from the macro base station 900.

Idle Mode Behavior and Hetnets

One aspect of the present disclosures is directed to the idle mode behavior of a UE when it is camped on a macro cell or pico cell, and in particular, to adjusting interference cancellation based on the mode of the UE. The radio resource control (RRC) idle mode is used when the eNodeB and/or UE do not have any data to transmit. Idle mode impacts the standby time of the UE. In idle mode, the UE performs searches, measurements, PBCH decoding, and monitoring SIB1. The UE also decodes PDCCH per every paging cycle (for example, every 1.28 seconds). On receiving a page meant for the UE or when the UE has uplink data to transmit, it initiates a random access channel (RACH) procedure to connect to its serving cell and transitions to the radio resource control (RRC) connected state.

The RRC connected state also includes the radio resource control (RRC) connected mode and the RRC connected mode DRX (discontinuous reception). The RRC connected mode is the mode in which the UE is receiving data. In this mode, the UE monitors subframes, performs mobility procedures, etc. The UE may be requested to transition to idle mode if the eNodeB does not expect any data transmission for the UE. The RRC connected mode DRX is a power saving mode within the connected mode. In this mode, the UE monitors PDCCH only on a subset of subframes and switches to RRC connected mode upon receiving a PDCCH corresponding to PDSCH/PUSCH.

When the cellular network pages a given UE, the page may be sent by several cells in a paging area (e.g., the tracking area group). Therefore the UE does not have to inform the base stations within the paging area as the UE moves between cells in the same paging area. However, as a UE moves to a new cell in a new paging area, outside the prior paging area, the UE will notify the eNodeB serving the new cell in order to ensure that pages to the UE are properly routed. The UE indicates the move by switching to the connected mode and initiating a random access control channel (RACH) to the new eNodeB. The UE may then switch back to idle mode when requested to by the new eNodeB.

In one aspect of the present disclosure, while in the CRE region, the UE may be configured to camp on the pico cell or configured to camp on the strongest cell (e.g., the macro cell). Additionally, the UE may be configured to camp on either of the cells (e.g., pico cell or strongest cell).

In one configuration, the UE camps on the pico cell in the range cell expansion region. This configuration provides a fast possible response time for the UE to switch from the idle mode to the connected mode as the UE can RACH the pico cell directly. The UE monitors all cells in its neighborhood including very weak pico cells and will therefore consume more power. For example, the UE may perform PSS/SSS interference cancellation (IC), PBCH interference cancellation, and/or CRS interference cancellation, in addition to its normal search and measurement operations in the idle mode. In one aspect, the UE may perform the interference cancellation operations at a different rate than when the UE is in the connected mode. For example, the UE may perform interference cancellation operations less frequently when in idle mode.

In another configuration, the UE camps on the strongest cell. In particular, the UE monitors the strongest cell (as in Release 8). In this configuration, the UE does not perform interference cancellation operations in the idle mode. Upon receiving a page or when the UE has uplink data, the UE uses one of the procedures below:

In one procedure, the UE first connects to the strongest cell. The UE looks for the weaker cell, possibly using PSS/SSS/PBCH interference cancellation. The UE then hands off to the weaker cell, if an appropriate weaker cell is found. This may result in increased handoff operations in the network as a handoff is done each time the CRE UEs switch from idle mode to connected mode.

In a second procedure, upon receiving a page, the UE performs the interference cancellation operation to detect all cells in the neighborhood including the weaker cells. Then, the UE will RACH directly to the cell the UE should ultimately connect to (for example pico cell in the range expansion region, strongest cell in other regions). The direct RACH avoids the handoff issue of the previous procedure but the time for responding to a page is longer (i.e., before the RACH can be triggered) as the UE detects whether there are any suitable weaker cells. Thus, the time for responding to a page can be lengthened. Hence a UE that is required to search for a weaker cell and send a RACH to a weaker cell if a suitable weaker cell is found is allowed more time to respond to a page than a UE that is required to connect to the cell that it was monitoring for paging. Furthermore, the UE may be performing a RACH to a cell different from the cell on which it received the page.

One aspect of the second procedure is related to the interference cancellation timeline. In particular, a UE in the connected mode may perform PSS/SSS interference cancellation at a certain duty cycle, such as once every 40 ms, to balance the power consumption with the detection time. In transitioning from the idle mode to the connected mode, a faster detection time may be implemented. Additionally, the UE processor is likely to be lightly loaded as it is still in idle mode. To improve the response time to the page, the PSS/SSS IC, PBCH IC, measurements, CRS IC, etc. may run at a higher duty cycle during this transition period. For example, the interference cancellation may occur every 5 ms during the transition period.

Figure 10:
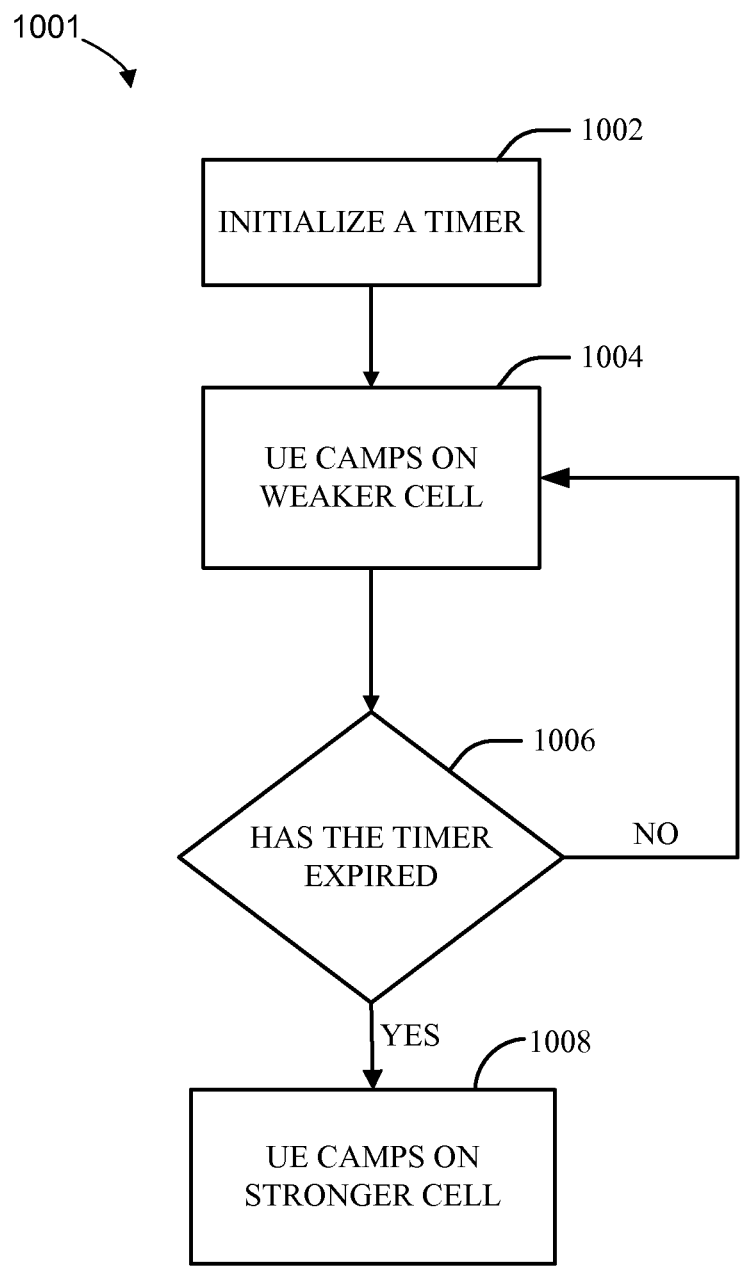
FIG. 10 is a flow diagram illustrating an idle mode operation.

In many scenarios, the UE is likely to switch back to connected mode a short time after switching to idle mode. However, if the UE has been in idle mode for an extended period of time, it is likely that the UE will continue to remain in idle mode. Configuring the UE to camp on the weaker cell (e.g., pico cell) for certain amount of time (T) just after the UE switches from connected mode to idle mode and switching to camping on the stronger cell if it remains in idle mode beyond time T may be beneficial for UEs connected to the weak cell that transition to idle state. This configuration provides a balance between faster response time and idle mode power consumption. In the event that the UE receives a page or wishes to switch back to connected mode within the time T, the UE can RACH directly to the weaker cell, yielding a fast response time. An example is illustrated in FIG. 10, where a timer is initialized in block 1002. In block 1004, the UE camps on a weaker cell. Block 1006 determines whether time T has passed. If it is determined that YES the time T has passed, then, in block 1008, the UE camps on the stronger cell. Instead, if it is determined that NO, the time T has not passed, at block 1006, then the processes is directed back to block 1004, where the UE camps on the stronger cell.

In addition, the above described UE configuration mitigates the frequent handover issue observed if all UEs are camping only on the stronger cell. If the UE does not identify a need to transition to connected mode before time T, the UE starts camping on the stronger cell. The UE thus saves power as the UE will be able to avoid performing search and measurement procedures, such as SSS interference cancellation (IC) or CRS IC to identify weak cells once it starts camping on the stronger cell.

In one aspect, the duration of time T is network configured. Alternately, the duration of time T may be determined autonomously at the UE. The UE may use a non-zero time T if the UE is being served by a cell that supports range extension. In one configuration, the duration of time T is selected such that the weaker cells have an opportunity to page a UE while it is still monitoring the weaker cells. Setting T to be greater than the paging periodicity ensure having at least one such opportunity.

In one aspect, it is less efficient for the UE to connect to a weaker cell (e.g., the pico cell) when the UE is receiving a small amount of data infrequently, because the UE can be quickly served by the stronger cell (e.g., the macro cell). The overhead/power consumption to switch to the weaker cell may make it inefficient to switch to the weaker cell. However, if the UE has a large amount of data to transmit/receive it would be more efficient for the UE to move to the pico cell.

Those skilled in the art will appreciate the UE may operate in a CRE enabled mode when it looks for a weaker cell or CRE disabled mode, whereby the UE does not look for the much weaker cells. Such modes may be configured by the base station or determined by the UE autonomously.

In another aspect of the present disclosure, the paging interruption time is a function of the paging cycle. The paging cycle refers to the duty cycle at which the UE monitors PDCCH for pages. The paging interruption time refers to the maximum allowed delay after receiving the page within which the UE has to respond to the page (e.g., by sending a RACH). For example, in applications where delay is not critical, the UE may be configured to receive pages at low rates such as once every 2.5 seconds. Here the allowed delay for responding to the page may be larger than in applications where the UE is expected to respond quickly. The additional delay may not impact performance as delay in not critical. On the other hand, for applications associated with a quicker response, the UE would typically be configured to receive pages at a higher rate such as every 160 ms and it would be desirable for the UE to respond to the page quickly as delay is critical. Allowing a larger paging interruption time for longer paging cycles and a smaller paging interruption time for shorter paging cycles may provide flexibility in responding to the page while having little impact on the performance.

In some applications, if a certain amount of delay (e.g., 3 seconds) is acceptable but not more, a faster response time may be expected for low duty rate paging cycles such as 2.5 seconds while a lower response time may be acceptable for higher duty rate paging cycles such as 160 or 320 ms.

Handoff Bias, Offsets, and Hetnets

In one example, the paging area is defined to include a particular number of macro cells (e.g., four or five). All of the base stations belonging to a particular paging area send pages to the UE. As long as the UE is within the same paging area, the UE does not inform the base station when it moves between cells. When the UE move between cells it will look for the strongest cell. If the strongest cell is within the same paging area, the UE will look for and receive pages from the strongest cell. When the UE moves to a different paging area, the UE establishes a connection and informs the cell in the new paging area that it has moved from the old paging area to the new paging area. The UE then receives the pages from the macro cell in the new paging area. Those skilled in the art will appreciate that a paging area may contain one macro cell rather than multiple macro cells. All cells in the paging area send the page to the UE, and accordingly, the larger the paging area, the more pages may be sent to contact the UE.

Different cells are ranked so the UE can determine which cell is the strongest cell. In one configuration, the cells are ranked according to the reference signal received power (RSRP). If a cell has a higher RSRP, that indicates the cell is a stronger cell. The cell-ranking criterion Rs for serving cell and Rn for neighboring cells is defined by:

$$Rs = Q\text{meas},s + Q\text{Hyst}$$

$$Rn = Q\text{meas},n - Q\text{offset}.$$

Qmeas is the RSRP measurement quantity used in cell reselections. Qmeas,s corresponds to the Qmeas for the serving cell, while Qmeas,n corresponds to the Qmeas for a neighboring cell. QHyst may represent a bias favoring the serving cell to reduce the likelihood of unnecessary or excessive handoffs. Alternatively, QHyst may be a variable. For example, a variable bias may be positive or negative depending on the type of cell serving the UE, or based on other considerations. Such a variable bias may promote early handoff to lower power cells (e.g., pico cells, femto cells or micro cells) and late handoff to high power cells (e.g., macro cells). Qoffsets, for intra-frequency, is equal to Qoffsets,n, if Qoffsets,n is valid, otherwise this equals zero. Qoffsets, for inter-frequency, is equal to Qoffsets,n plus Qoffsetfrequency, if Qoffsets,n is valid, otherwise this equals Qoffsetfrequency.

The UE performs ranking of all cells that fulfil the cell selection criterion but may exclude all closed subscriber group cells known by the UE to be not allowed.

To accommodate the power-efficient UE implementation, an eNodeB allows a UE in range expansion to camp on either the strongest cell or a weaker cell with range expansion. In one configuration, a current single Qoffset is kept in the system information. This allows for UE implementation flexibility when camping on a cell that is not the highest ranked cell. In another configuration, multiple Qoffset values are broadcast, so that UEs can perform camping procedures using one of the broadcast values. Additionally, the UE may inform the network of a preferred Qoffset, which may be application specific. Additionally, the paging area includes at least both the strongest cell and the weak cells. More specifically, the paging area may include a macro cell and all of the range expansion pico cells under the macro coverage.

Figures 11A, 11B:
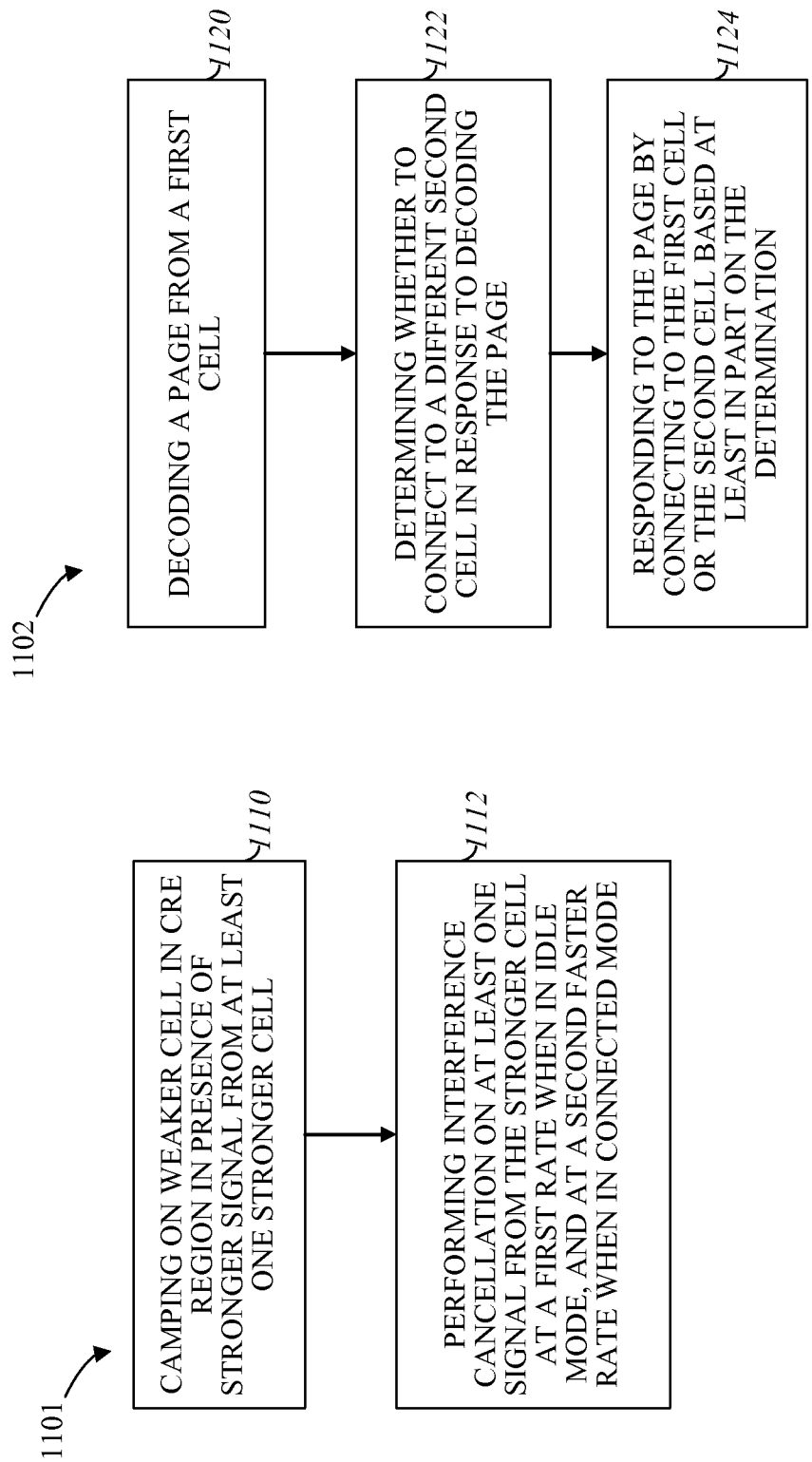

FIGS. 11A-11D illustrate various methods of idle mode operation in heterogeneous networks. FIG. 11A illustrates a method 1101 of idle mode operation where the UE camps on a weaker cell. In particular, in block 1110, the UE camps on a weaker cell, such as a pico cell, in a range expansion region in the presence of stronger signals from a stronger cell. The UE can quickly switch from an idle mode to a connected mode because the UE can RACH the weaker cell directly. The UE monitors all of the cells in its neighborhood and can perform interference cancellation on the signals from the cells. In block 1112, the UE performs interference cancellation (IC) on the signals from the stronger cell. The signals may include PSS, SSS, PBCH and/or CRS. The interference cancellation is performed at a first rate when the UE is in the idle mode, and at a second faster rate when the UE is in the connected mode. For example, the UE may perform interference cancellation less frequently when in the idle mode.

In one configuration, the UE 650 is configured for wireless communication including means for camping. In one aspect, the camping means may be the memory 660 and/or controller/processor 659 configured to perform the functions recited by the camping means. The UE 650 is also configured to include a means for performing interference cancellation. In one aspect, the performing means may be the memory 660 and/or controller/processor 659 configured to perform the functions recited by the performing means. In another aspect, the aforementioned means may be a module or any apparatus configured to perform the functions recited by the aforementioned means.

FIG. 11B illustrates a method 1102 of idle mode operation where the UE camps on the strongest cell. The UE monitors the strongest cell, but may or may not perform any interference cancellation operations in idle mode. In block 1120, the UE decodes a page from a first cell. The UE then determines whether to connect the first cell or to a different cell in response to decoding the page from the first cell, in block 1122. The UE responds to the page by connecting to the first cell or the second cell based at least in part on the determination, in block 1124. The UE will RACH directly to the cell the UE should ultimately connect to. For example, the UE will respond to a pico cell in the range expansion region, or a strongest cell in other regions.

In one configuration, the UE 650 is configured for wireless communication including means for decoding. In one aspect, the decoding means may be the controller processor 659 and or memory 660 configured to perform the functions recited by the decoding means. The UE 650 is also configured for wireless communication including means for determining. In one aspect, the determining means may be the controller/processor 659 and/or memory 660 configured to perform the functions recited by the determining means. The UE 650 is also configured for wireless communication including means for responding. In one aspect, the responding means may be the controller processor 659 and/or memory 660 configured to perform the functions recited by the responding means.

FIG. 11C illustrates a method 1103 for idle mode operation in a heterogeneous network. In block 1130, a UE receives signals from a stronger cell. In block 1132, the UE receives a signal from a weaker cell. The stronger cell has a higher transmit power than the weaker cell. In block 1134, the UE determines whether to camp on the stronger cell or the weaker cell. The determination is based on the duration of time since the UE transitioned from a connected mode to an idle mode. The UE may camp on the weaker cell (e.g., pico cell) for certain amount of time (T) just after the UE switches from connected mode to idle mode. Additionally, the UE may switch to camping on the stronger cell if it remains in idle mode beyond time T.

In one configuration, the UE 650 is configured for wireless communication including means for receiving. In one aspect, the receiving means may be the antenna 652, receivers 654, receive processor 656, memory 660 and/or controller/processor 659 configured to perform the functions recited by the receiving means. The UE 650 is also configured to include a means for determining. In one aspect, the determining means may be the memory 660 and/or controller/processor 659 configured to perform the functions recited by the determining means. In another aspect, the aforementioned means may be a module or any apparatus configured to perform the functions recited by the aforementioned means.

FIG. 11D illustrates a method 1104 for idle mode operation in a network where different cells are ranked to enable a UE to determine which cell is the strongest cell. In block 1140, the UE identifies a serving base station rank value. The serving base station rank value is determined, at least in part, based on a received serving base station signal power and a bias value. The bias value may be a variable, or it may represent a value favoring the serving cell. The UE, in block 1142, also identifies a neighboring base station rank value. The neighboring base station rank value is determined, at least in part, based on a received neighboring base station signal power and an offset value. The UE ranks the cells that fulfill cell selection criteria. In block, 1144, the UE initiates a handoff from the serving station to the neighboring station when the serving base station rank value is less than the neighboring base station rank value.

In one configuration, the UE 650 is configured for wireless communication including means for identifying. In one aspect, the identifying means may be the memory 660 and/or controller/processor 659 configured to perform the functions recited by the identifying means. The UE 650 is also configured to include a means for initiating. In one aspect, the initiating means may be the memory 660 and/or controller/processor 659 configured to perform the functions recited by the initiating means. In another aspect, the aforementioned means may be a module or any apparatus configured to perform the functions recited by the aforementioned means.

Figure 12:
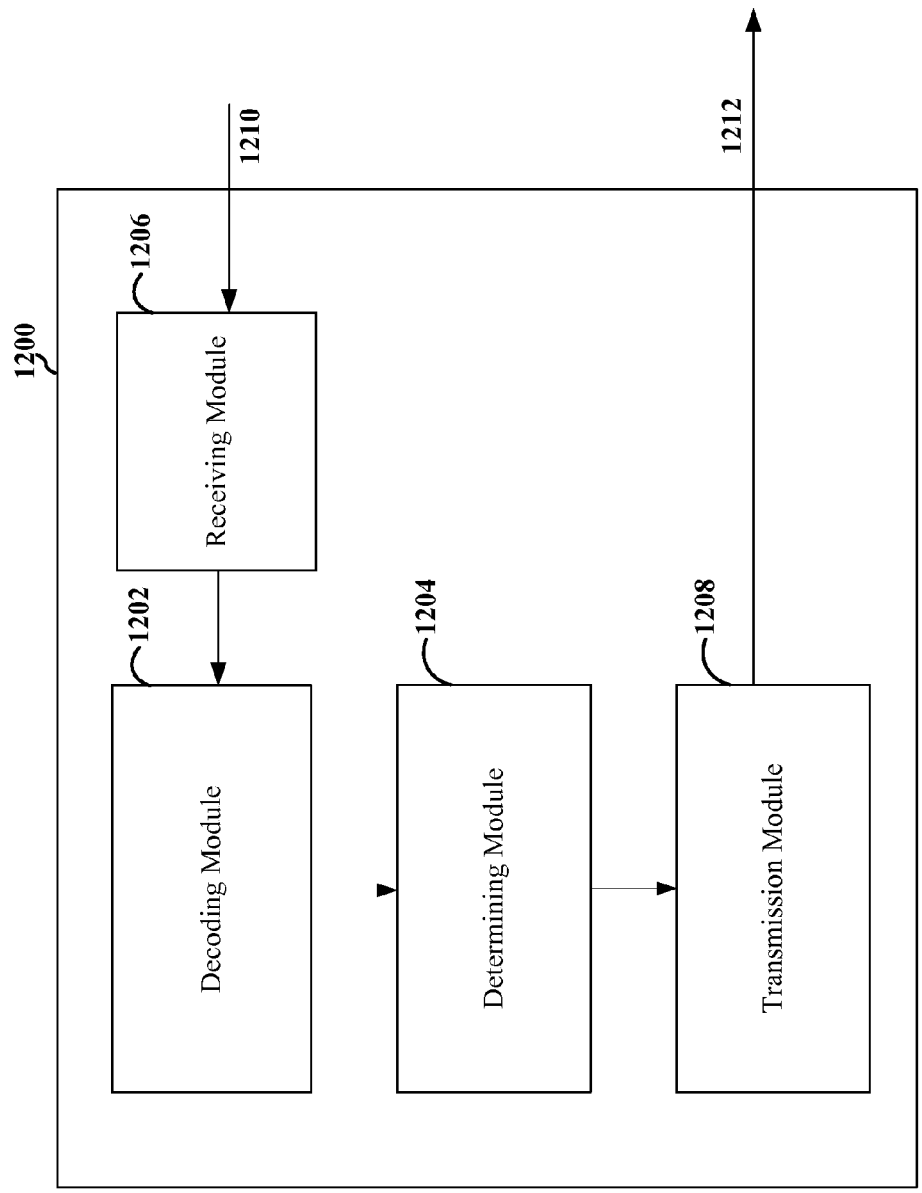
FIGS. 12-14 are conceptual data flow diagrams illustrating the data flow between different modules/means/components in an exemplary apparatus.

FIG. 12 is a conceptual data flow diagram illustrating the data flow between different modules/means/components in an exemplary apparatus 1200. The apparatus 1200 includes a receiving module 1206 that receives a page from a first cell. The receiving module 1206 passes the page to the decoding module 1202. The decoding module 1202 decodes the pages and sends the decoded information to the determining module 1204. The determining module 1204 determines whether to connect to a different second cell in response to the decoded page. The determining module 1204 sends the decision to the transmission module 1208 which responds to the page by connecting to the first cell or the second cell via a signal 1212. The apparatus may include additional modules that perform each of the steps of the algorithm in the aforementioned flow chart 11B. As such, each step in the aforementioned flow charts FIG. 11B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
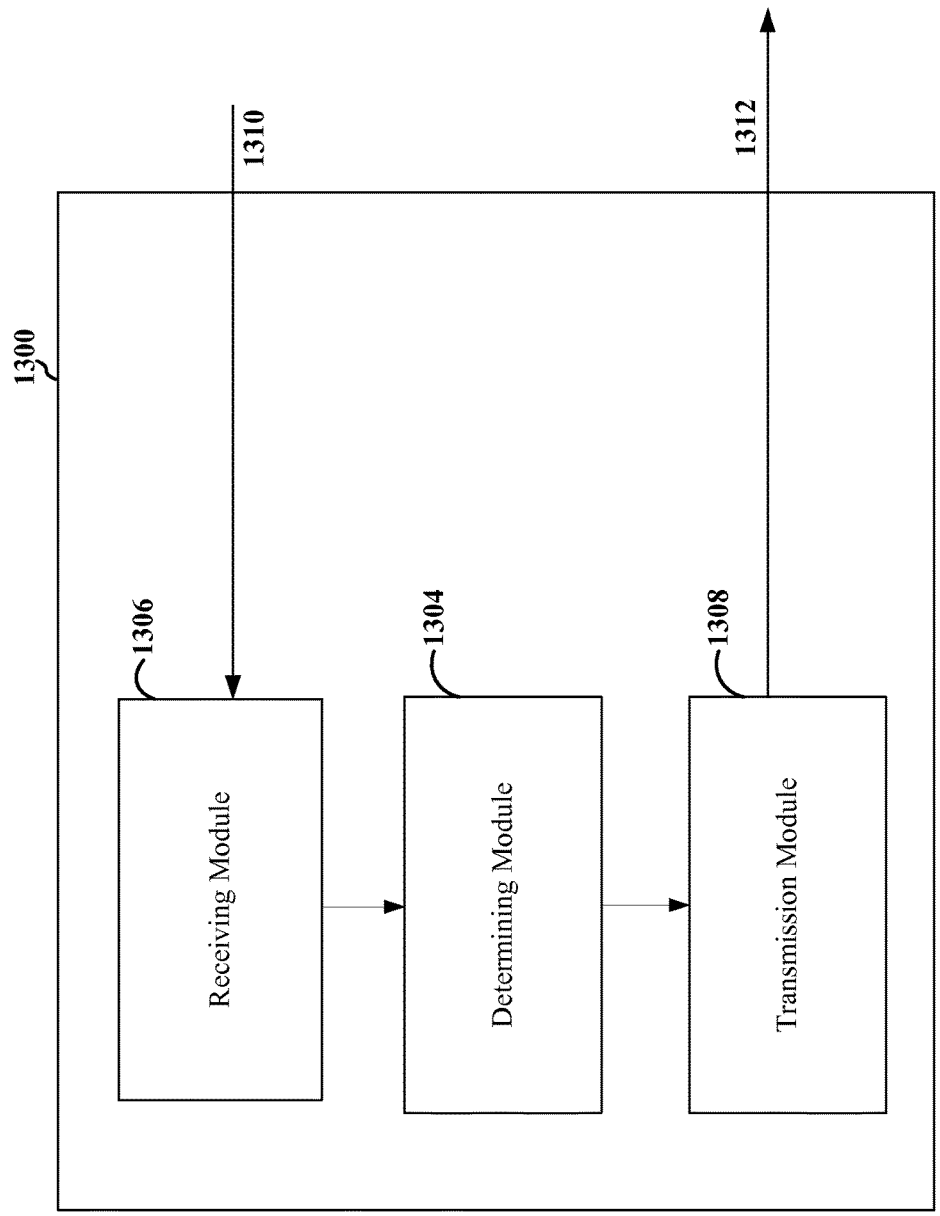

FIG. 13 is a conceptual data flow diagram illustrating the data flow between different modules/means/components in an exemplary apparatus 1300. The apparatus 1300 includes a receiving module 1306 that receives signals from a stronger cell. The receiving module 1306 also receives signals from a weaker cell. The receiving module 1306 passes the received signals to a determining module 1304 that determines whether to camp on the stronger or weaker cell. The determination module 1304 passes its decision to the transmission module 1308 that responds by transmitting a signal to connect to the determined cell. The apparatus may include additional modules that perform each of the steps of the algorithm in the aforementioned flow charts FIG. 11C. As such, each step in the aforementioned flow charts FIG. 11C may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
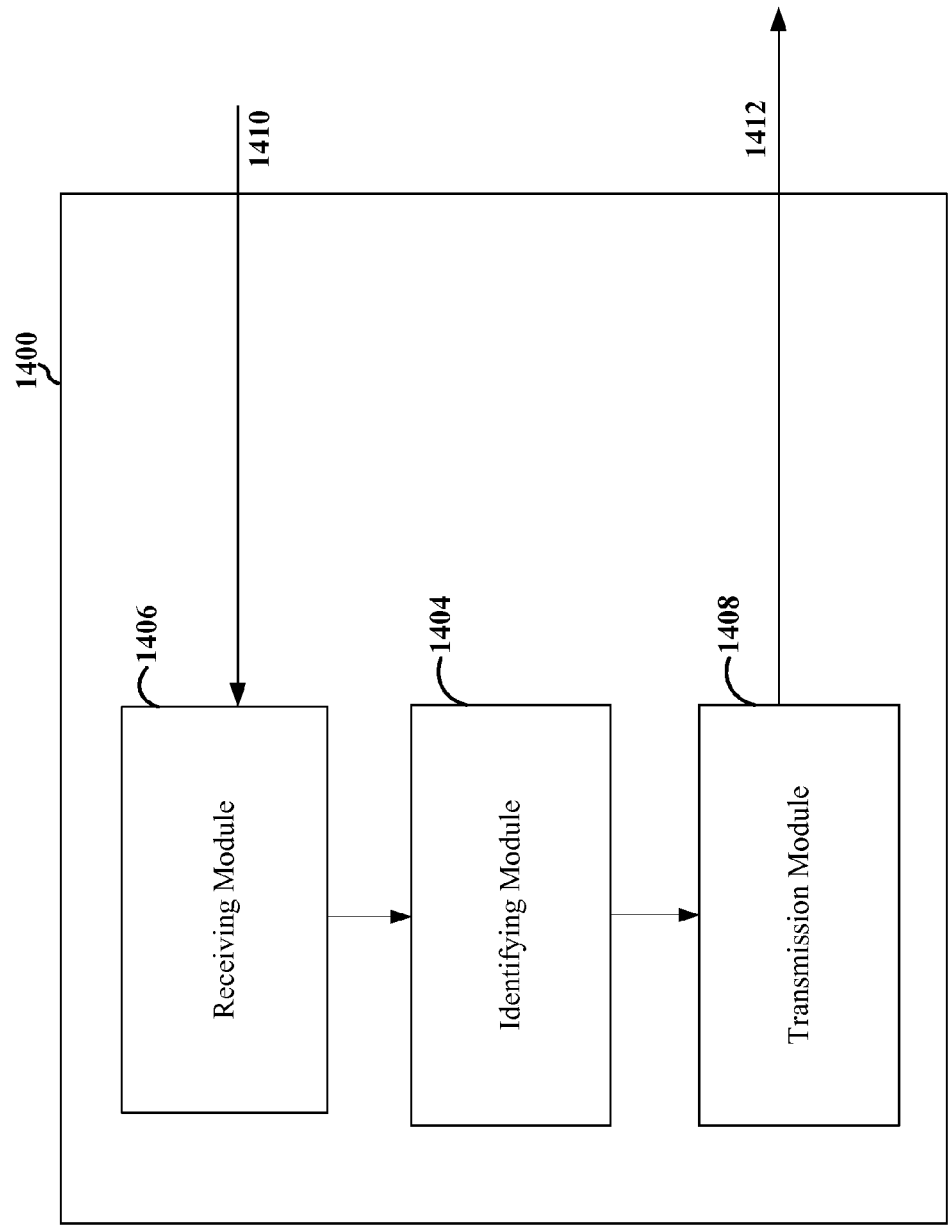

FIG. 14 is a conceptual data flow diagram illustrating the data flow between different modules/means/components in an exemplary apparatus 1400. The apparatus 1400 includes a receiving module 1406 that receives rank values for serving base stations and neighboring base stations. The apparatus 1400 also includes an identifying module 1404 that receives the rank values from the receiving module 1406. The identifying module identifies a serving base station rank value and a neighboring base station rank value. When the serving base station rank value is less than the neighboring base station rank value, the identifying module passes a signal to the transmission module 1408. The transmission module 1408, then initiates a handoff from the serving station to the neighboring station via a signal 1412. The apparatus may include additional modules that perform each of the steps of the algorithm in the aforementioned flow charts FIG. 11D. As such, each step in the aforementioned flow charts FIG. 11D may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
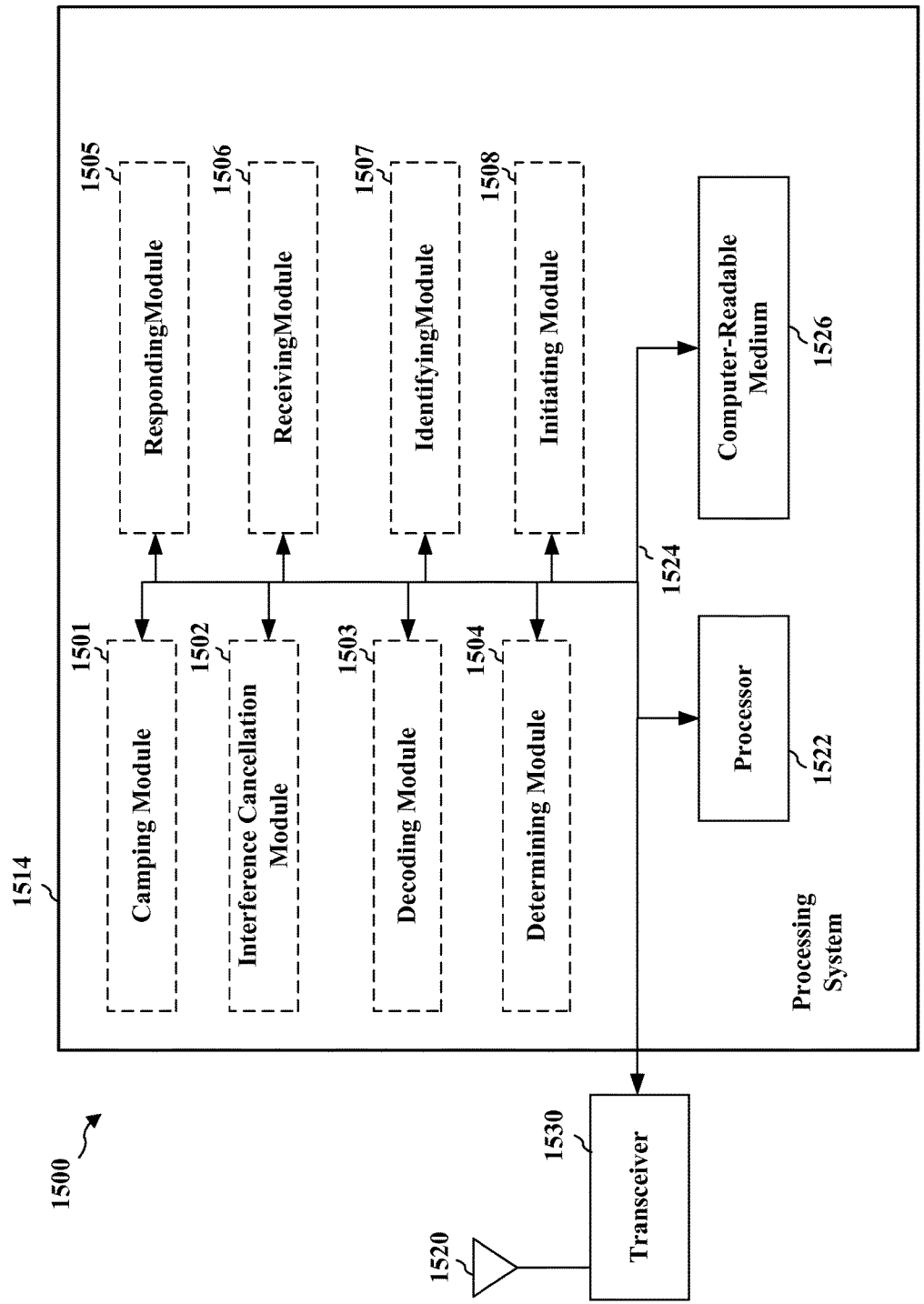
FIG. 15 is a block diagram illustrating different modules/means/components in an exemplary apparatus.

FIG. 15 is a diagram illustrating examples of a hardware implementation for an apparatus 1500 employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1522 and the computer-readable medium 1526. The bus 1524 may also link various other circuits such as timing sources, peripherals, voltage regulators, and power management circuits, which are well known in the art, and therefore, will not be described any further.

The apparatus includes a processing system 1514 coupled to a transceiver—1530. The transceiver 1530 is coupled to one or more antennas 1520. The transceiver 1530 enables communicating with various other apparatus over a transmission medium. The processing system 1514 includes a processor 1522 coupled to a computer-readable medium 1526. The processor 1522 is responsible for general processing, including the execution of software stored on the computer-readable medium 1526. The software, when executed by the processor 1522, causes the processing system 1514 to perform the various functions described for any particular apparatus. The computer-readable medium 1526 may also be used for storing data that is manipulated by the processor 1522 when executing software.

The processing system 1514 may contain all, or a portion of, the modules 1501-1508 linked together by the bus 1524. In one aspect, the processing system 1514 includes a camping module 1501 and an interference cancellation module 1502. The camping module 1501 is utilized when the UE camps on a weaker cell. The interference cancellation module 1502 is used when the UE performs interference cancellation.

In another aspect, the processing system 1514 includes a decoding module 1503, a determining module 1504 and a responding module 1505. The decoding module 1503 decodes a page from a first cell. The determining module 1504 determines whether to connect to a different second cell in response to decoding the page. The responding module 1505 responds to the page by connecting to the first cell or the second cell based at least in part on the determination.

In another aspect, the processing system 1514 includes a receiving module 1506 and a determining module 1504. The receiving module 1506 receives signals from a stronger cell and from a weaker cell. The determining 1504 determines whether to camp on the stronger cell or the weaker cell.

In another aspect, the processing system 1514 includes an identifying module 1507 and an initiating module 1508. The identifying module 1507 identifies a serving base station rank value and a neighbor base station rank value. The initiating module 1508 initiates a handoff from the serving station to the neighboring station.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a user equipment (UE), comprising:
   camping on a stronger cell while in idle mode;
   performing interference cancellation on stronger signals from neighboring cells to enable the UE to detect weaker cells, in response to receiving a page from the stronger cell;
   detecting the weaker cells found during the interference cancellation; and
   connecting to a selected one of the weaker cells to establish a call associated with the page.

2. The method of claim 1, in which performing the interference cancellation comprises cancelling at least one of a primary synchronization signal (PSS), secondary synchronization signal (SSS), a physical broadcast channel (PBCH) or a common reference signal (CRS).

3. The method of claim 1, in which camping on the stronger cell comprises performing no interference cancellation while in the idle mode.

4. The method of claim 1, in which the connecting comprises performing a random access channel (RACH) procedure directly with the selected one of the weaker cells.

5. The method of claim 1, in which the weaker cell comprises a pico cell and the stronger cell comprises a macro cell.

6. The method of claim 1, in which performing the interference cancellation comprises processing at a higher duty cycle while in the idle mode than when performing interference cancellation while in connected mode.

7. An apparatus for wireless communication, comprising:
   means for camping on a stronger cell while in idle mode;
   means for performing interference cancellation on stronger signals from neighboring cells to enable the apparatus to detect weaker cells, in response to receiving a page from the stronger cell;
   means for detecting the weaker cells found during the interference cancellation; and
   means for connecting to a selected one of the weaker cells to establish a call associated with the page.

8. The apparatus of claim 7, further comprising means for cancelling at least one of a primary synchronization signal (PSS), secondary synchronization signal (SSS), a physical broadcast channel (PBCH) or a common reference signal (CRS).

9. The apparatus of claim 7, further comprising means for performing no interference cancellation while in the idle mode.

10. The apparatus of claim 7, further comprising means for performing a random access channel (RACH) procedure directly with the selected one of the weaker cells.

11. The apparatus of claim 7, in which the weaker cell comprises a pico cell and the stronger cell comprises a macro cell.

12. The apparatus of claim 7, further comprising means for processing at a higher duty cycle while in the idle mode than when performing interference cancellation while in connected mode.

13. An apparatus for wireless communication, comprising:
   a memory; and
   at least one processor coupled to the memory, the at least one processor configured:
   to camp on a stronger cell while in idle mode;
   to perform interference cancellation on stronger signals from neighboring cells to enable the apparatus to detect weaker cells, in response to receiving a page from the stronger cell;
   to detect the weaker cells found during the interference cancellation; and
   to connect to a selected one of the weaker cells to establish a call associated with the page.

14. The apparatus of claim 13, in which the at least one processor is further configured to cancel at least one of a primary synchronization signal (PSS), secondary synchronization signal (SSS), a physical broadcast channel (PBCH) or a common reference signal (CRS).

15. The apparatus of claim 13, in which the at least one processor is further configured to perform no interference cancellation while in the idle mode.

16. The apparatus of claim 13, in which the at least one processor is further configured to perform a random access channel (RACH) procedure directly with the selected one of the weaker cells.

17. The apparatus of claim 13, in which the weaker cell comprises a pico cell and the stronger cell comprises a macro cell.

18. The apparatus of claim 13, in which the at least one processor is further configured to process at a higher duty cycle while in the idle mode than when performing interference cancellation while in connected mode.

19. A computer program product for wireless communication in a wireless network, comprising:
   a non-transitory computer-readable medium having non-transitory program code recorded thereon, the program code comprising:
   program code to camp on a stronger cell while in idle mode;
   program code to perform interference cancellation on stronger signals from neighboring cells to enable detection of weaker cells, in response to receiving a page from the stronger cell;
   program code to detect the weaker cells found during the interference cancellation; and
   program code to connect to a selected one of the weaker cells to establish a call associated with the page.

20. The computer program product of claim 19, further comprising program code to cancel at least one of a primary synchronization signal (PSS), secondary synchronization signal (SSS), a physical broadcast channel (PBCH) or a common reference signal (CRS).

21. The computer program product of claim 19, further comprising program code to perform no interference cancellation while in the idle mode.

22. The computer program product of claim 19, further comprising program code to perform a random access channel (RACH) procedure directly with the selected one of the weaker cells.

23. The computer program product of claim 19, in which the weaker cell comprises a pico cell and the stronger cell comprises a macro cell.

24. The computer program product of claim 19, further comprising program code to process at a higher duty cycle while in the idle mode than when performing interference cancellation while in connected mode.

* * * * *